Dec. 16, 1924.
G. J. SEISS
ELECTRIC MOTOR
Filed March 1, 1923
1,519,222
2 Sheets-Sheet 1
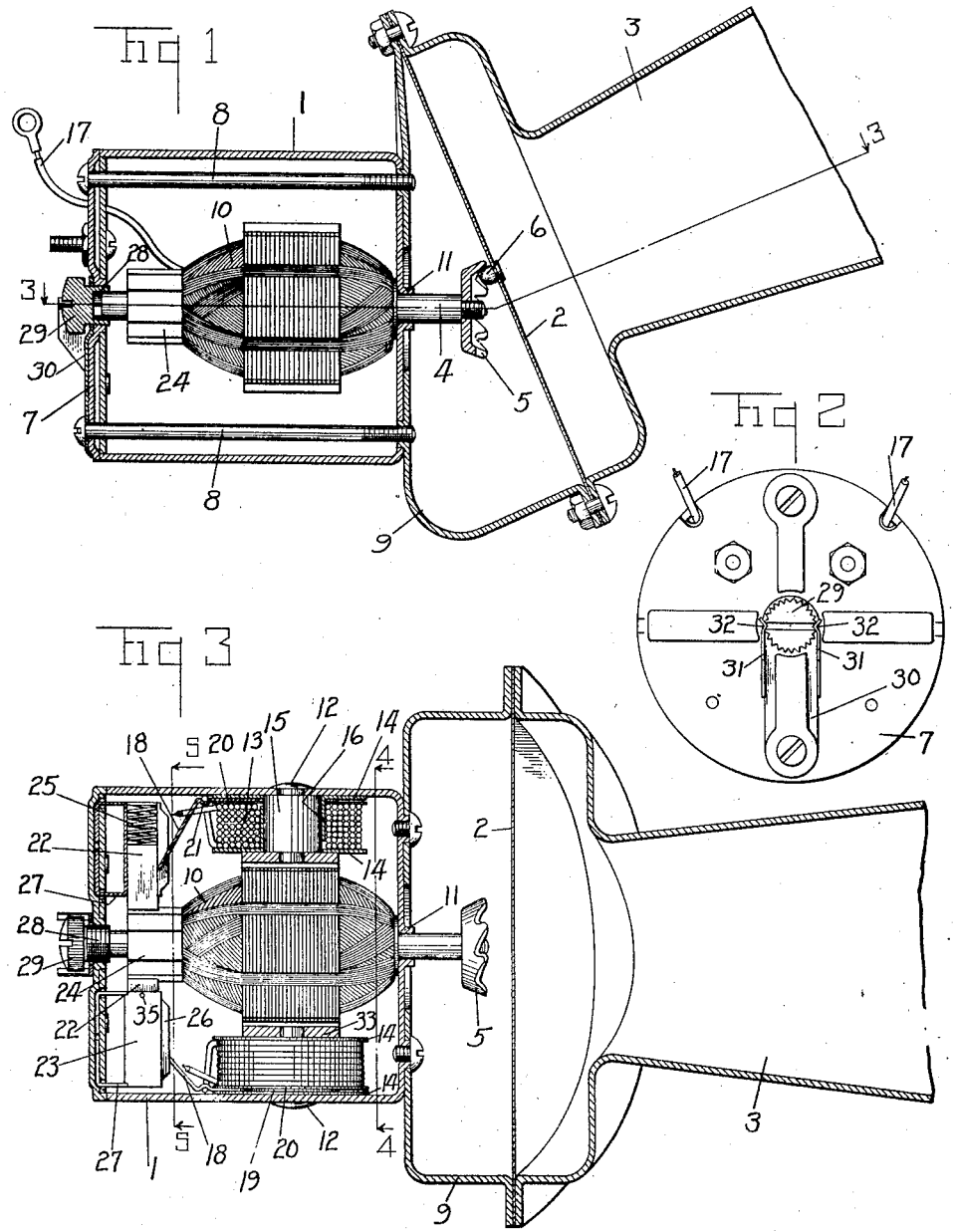
INVENTOR
George J. Seiss
by
Owen, Owen & Crampton Dec. 16, 1924.
G. J. SEISS
ELECTRIC MOTOR
Filed March 1, 1923
1,519,222
2 Sheets-Sheet 2
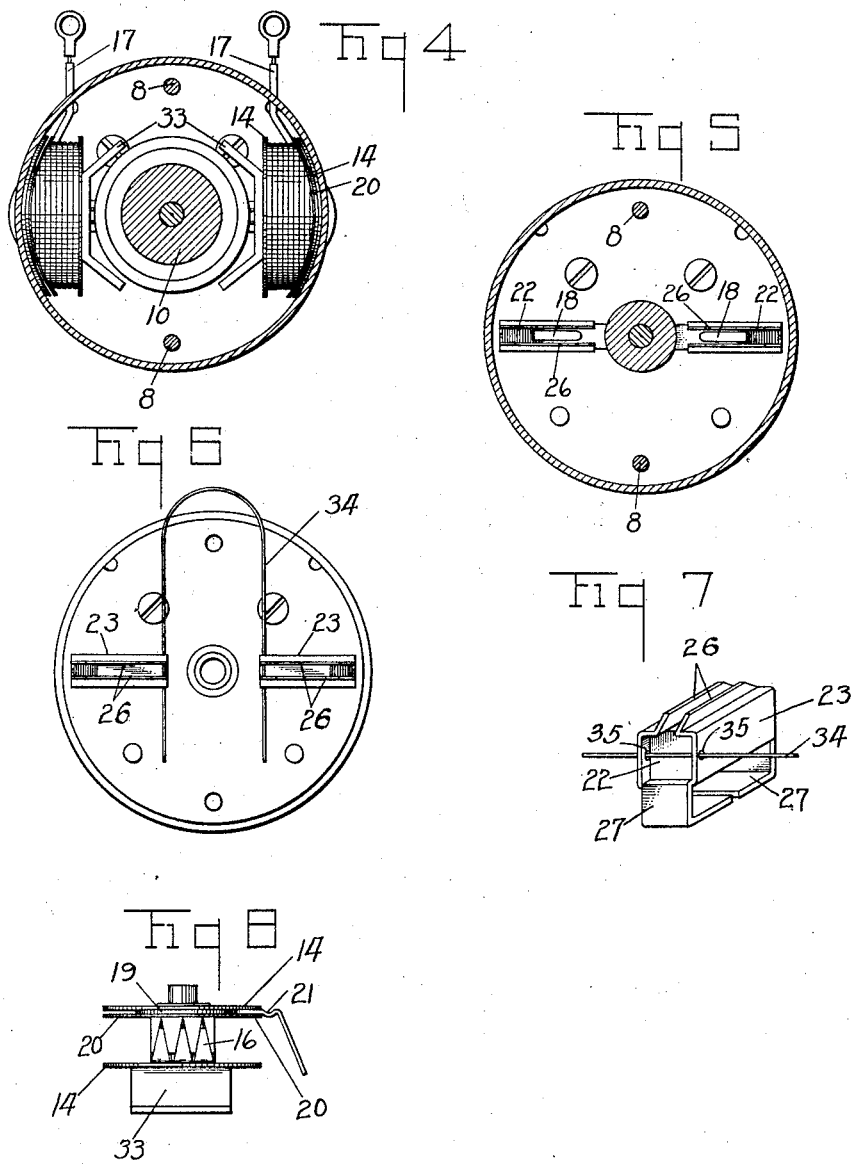
INVENTOR.
George J. Seiss
by
Owen, Owen & Crampton Patented Dec. 16, 1924.

1,519,222

UNITED STATES PATENT OFFICE.

GEORGE J. SEISS, OF TOLEDO, OHIO.

ELECTRIC MOTOR.

Application filed March 1, 1923. Serial No. 622,018.

*To all whom it may concern:*

Be it known that I, GEORGE J. SEISS, a citizen of the United States, and a resident of Toledo, in the county of Lucas and State of Ohio, have made an invention appertaining to an Electric Motor, which invention is fully set forth in the following specification.

My invention has for its object to provide an efficient shell enclosed electric dynamo, such as a motor, that may be made at a very low cost of production. The invention particularly has for its object to so construct the parts of the motor that the motor may be rapidly assembled by practically unskilled labor, whereby the motors may be turned out under quantity production, that is, in large quantities, at a low production cost.

The invention may be contained in motors of different forms. To illustrate a practical application of the invention I have selected a motor containing the invention and shall describe it hereinafter. The motor selected for purposes of illustration is a small motor used for operating the diaphragm of a horn. It is shown in the accompanying drawings and is described hereinafter.

Figure 1 of the drawings illustrates a longitudinal sectional view of the motor. Fig. 2 illustrates an end view of the shell enclosing the motor. Fig. 3 is a sectional view taken on the line 3—3 indicated in Fig. 1. Fig. 4 is a sectional view taken on the line 4—4 indicated in Fig. 3. Fig. 5 is a sectional view taken on the line 5—5 indicated in Fig. 3. Fig. 6 illustrates a means for temporarily securing the carbon brushes preparatory to closing the shell. Fig. 7 is an enlarged view of a part shown in Fig. 6. Fig. 8 illustrates a field pole and the means used for insulating the field coil that magnetizes the pole.

1 is the shell that contains the motor that may be used to operate the diaphragm 2 of a horn 3, the shaft 4 of the motor being provided with a crown wheel 5 that operates on the button 6 located on the diaphragm 2 in the manner well known in the art. The shell 1 is closed by an end plate 7, and tie bolts 8 that pass through the end plate 7 and the shell 1 are threaded into the supporting shell 9 of the horn, thus the parts are securely held in their relative positions.

The metal parts of the motor are largely made of stampings, and consequently may be cheaply produced. The armature 10 is of the usual type found in small motors and has a bearing 11 formed by an outwardly extending flange formed in the end of the shell 1.

The field magnets or poles are riveted to the shell 1, as at 12, and the field coils 13 are wound between discs 14 of insulating material that have openings formed therein by cutting serrations or points from their center and bending the points at right angles to the surfaces of the discs. The discs are then slipped over the cores 15 and are so placed that the points 16 of the discs placed on each core interfit and substantially cover the surface of the core, as shown in Fig. 8 of the drawings. This thoroughly insulates the core from the coil wound on the core and between the discs.

The motor is a series motor and consequently the circuit is through the coils and the armature. In the construction shown the circuit is through one coil, through the armature, and then through the other coil. Connection with an external circuit is made to one of the terminals of each of the coils, such as to the terminals 17. The other end or terminal of each coil is connected to an elastic contact 18 which is also supported on the core 15. The elastic contacts 18 are formed integral with small discs 19 located between one of the insulating discs 14 of each pole, and an insulating disc 20. The contacts 18 are bent to form recesses 21 into which the ends of the coils are inserted or secured, as by bending or by soldering or in any other suitable manner. Thus the connections of the field coils are made to the external circuit and to other parts of the motor.

The elastic contacts 18 extend diagonally towards the center of the end plate 7 and make contact with the carbon brushes or blocks 22. The carbon brushes or blocks are slidably movable in guides or boxes 23 and are pressed towards the commutator 24 of the motor by means of the springs 25 located between the ends of the blocks 22 and the ends of the boxes 23. The boxes or guides 23 have slots extending along one side thereof and flanges 26 extend outward from the slots. The contacts 18 extend between the flanges 26 and into the slots, and thus make contact with the carbon blocks or brushes 22. The flanges 26 guide the contacts 18 into contact with the blocks in the assembling and operating, to hold the contacts 18 into contact with the blocks, notwithstanding any jarring or rough usage to which the motor may be subjected.

The brushes 22 and the guides or boxes 23 are secured to the end plate 7. They are insulatingly secured by means of bent arms 27 that form brackets for supporting the brushes in position to make contact with the commutator.

The outer end of the armature shaft is supported in a threaded bearing 28 that may be screwed into the end plate 7. The bearing 28 is provided with a slotted head 29 whereby adjustment of the bearing end of the shaft may be readily made by means of an ordinary screw driver. In order to secure the bearing in its adjusted position the lateral surface of the head may be provided with a ratchet or serrated or corrugated surface and a sheet metal arm 30 may be secured by one of the tie bolts 8 at one end. The adjustable bearing 28 may be inserted through an opening formed in the other end of the arm. Elastic flanges 31 may be struck up from the sides of the arm to form springs. The ends of the springs are bent to form engaging ridges 32 that substantially fit or engage the indentations or serrations of the adjustable bearing 28. The position of the springs is such that the head 29 tightly fits between the springs. Rotation of the head is thus yieldingly prevented by the springs 31 that engage the serrations of the bearing.

In assembling, the field poles 33 are riveted to the cores 15. The coils are placed upon the cores. The elastic contacts 18 are bent into position and the cores 15 are riveted to the shell. The carbon blocks or brushes 22 are pushed into the boxes or guides 23 and are held therein by a bent wire 34 that extends through openings 35 formed in the inner ends of the sides of the guides 23. The end plate 7 is then placed on the shell 1, the loop of the wire 34 slightly protruding from beneath the cover plate, so that the contacts 18 are located between the flanges 26 and make contact with the blocks 22. When in this position the blocks 22 are in line with the commutator 24, the end plate 7 being substantially closed, except for the protruding wire 34. The wire 34 is then withdrawn and the springs 25 press the blocks 22 against the commutator. The end plate is then closed tight and secured in position by the tie bolts 8. The crown wheel may then be placed on the shaft and the horn assembled.

I claim:

1. In an electric motor having field coils and field cores, insulating end discs for the field coils having openings formed therein for the field cores, serrated flanges extending around the openings of the insulating discs and dove-tailing with each other to substantially cover and electrically insulate the cores.

2. In an electric motor having field coils and field cores and brushes, insulating end discs for the field coils having openings formed therein for the field cores, serrated flanges extending around the openings of the insulating discs and dove-tailing with each other to substantially cover and electrically insulate the core, elastic contacts insulatingly secured to the cores by the insulating disks and located in contact with the brushes.

3. In an electric motor field coils and field cores and brushes, insulating end discs for the field coils having openings formed therein for the field cores, serrated flanges extending around the openings of the insulating discs and dove-tailing with each other to substantially cover and electrically insulate the core, metal discs insulatingly supported on the cores, by the insulating disks, elastic contacts formed integral with the metallic discs and located in contact with the brushes.

4. In an electric motor field cores and brushes, metallic discs insulatingly supported on the field cores, elastic contacts formed integral with the metallic discs and located in contact with the brushes.

5. In an electric motor having cores and brushes, an enclosing shell, field poles secured to the shell, metallic discs insulatingly supported on the cores, elastic contacts formed integral with the metallic discs, an end plate for closing the shell, the brushes supported on the end plate and so as to make contact with the elastic contacts.

6. In an electric motor having field cores a commutator and brushes, elastic contacts insulatingly supported on the field cores, boxes for containing and guiding the brushes of the motor and having slots formed therein for receiving the contacts, springs for pressing the brushes against the commutator.

7. In an electric motor having field cores, a commutator and brushes, elastic contacts insulatingly supported on the field cores, boxes for containing and guiding the brushes of the motor and having slots formed therein, flanges located on opposite sides of the slots for receiving and maintaining the contacts in contact with the brushes of the motor, springs for pressing the brushes against the commutator.

8. In an electric motor having cores, a commutator and brushes, a shell, an end plate for closing the shell, contacts insulatingly supported on the cores, boxes insulatingly supported on the end plate and having slots formed therein for receiving the contacts, springs for pressing the brushes against the commutator.

9. In an electric motor having cores, a commutator and brushes, a shell, an end plate for closing the shell, contacts insulatingly supported on the cores, boxes insulatingly supported on the end plate and having slots formed therein, flanges located on opposite sides of the slots for receiving and maintaining the contacts in contact with the brushes, springs for pressing the brushes against the commutator.

10. In an electric motor having cores, a commutator and brushes, a shell, an end plate for closing the shell, contacts insulatingly supported on the cores, boxes insulatingly supported on the end plate and having slots formed therein for receiving the contacts, springs for pressing the brushes against the commutator, means for temporarily holding the brushes relatively remote from the commutator until the end plate is placed in position on the shell and the contacts make contact with the brushes.

11. In an electric motor having cores, a commutator and brushes, a shell, an end plate for closing the shell, contacts insulatingly supported on the cores, boxes insulatingly supported on the end plate and having slots formed therein for receiving the contacts, springs for pressing the brushes against the commutator, a wire member for temporarily holding the brushes relatively remote from the commutator until the end plate is placed in position on the shell and the contacts make contact with the brushes.

12. In an electric motor having cores, a commutator and brushes, a shell, an end plate for closing the shell, contacts insulatingly supported on the cores, boxes insulatingly supported on the end plate and having slots formed therein for receiving the contacts, springs for pressing the brushes against the commutator, the boxes having openings formed in the ends of the sides, a wire member extending through the openings for temporarily holding the brushes from the commutator until the end plate is placed in position on the shell and the contacts make contact with the brushes.

13. In an electric motor having cores, a commutator and brushes, a shell, an end plate for closing the shell, contacts insulatingly supported on the cores, boxes insulatingly supported on the end plate and having slots formed therein, flanges located on opposite sides of the slots for receiving and maintaining the contacts in contact with the brushes, springs for pressing the brushes against the commutator, the boxes having openings formed in the ends of their sides, a wire member extending through the openings for temporarily holding the brushes relatively remote from the commutator until the end plate is placed in position on the shell and the contacts make contact with the brushes.

14. In an electric motor having an armature shaft, a threaded adjustable bearing for the armature shaft, the bearing having a circular serrated surface, a spring pressed member for yieldingly engaging the serrated surface for retaining the bearing in its adjusted position.

15. In an electric motor having an armature shaft, a threaded adjustable bearing for the armature shaft, the bearing having a circular serrated surface, a pair of springs yieldingly engaging the serrated surface for retaining the bearing in its adjusted position.

16. In an electric motor having an armature shaft, a threaded adjustable bearing for the armature shaft, the bearing having a circular serrated surface, a sheet metal arm, a pair of flanges located on opposite sides of the arm and forming springs for yieldingly engaging the serrated surface for retaining the bearing in its adjusted position.

17. In an electric motor having an armature shaft, a shell for enclosing the motor, an end plate for closing the shell, a threaded adjustable bearing located in the end plate for supporting one end of the armature shaft, the bearing having a circular serrated surface, a sheet metal arm secured to the end plate and having a pair of flanges located on opposite sides of the arm and forming springs for yieldingly engaging the serrated surfaces for retaining the bearing in its adjusted position.

18. In an electric motor having field cores and brushes, a shell for containing the motor and having an end plate, the field cores riveted to the shell, elastic contacts insulatingly supported on the cores, boxes supported on the end plate and for containing and guiding the brushes, springs for pressing the brushes against the commutator, the guide boxes having slots for receiving the contacts, flanges located on opposite sides of the slots for retaining the contacts in contact relation to the brushes.

19. In an electric motor having a commutator and brushes, a shell for containing the motor, an end plate for closing the shell and for supporting the brushes, springs for pressing the brushes against the commutator, means for temporarily holding the brushes relatively remote from the commutator until the end plate is placed in position on the shell.

20. In an electric motor having a commutator and brushes, a shell for containing the motor, an end plate for closing the shell and for supporting the brushes, springs for pressing the brushes against the commutator, a removable wire member for temporarily holding the brushes relatively remote from the commutator until the end plate is placed in position on the shell.

21. In an electric motor having a commutator and brushes, a shell for containing the motor, an end plate for closing the shell, guide boxes for containing the brushes and supported on the end plate, springs for pressing the brushes against the commutator, the guide boxes having openings formed in the ends of their sides and a removable wire member located in the openings for temporarily holding the brushes relatively remote from the commutator until the end plate is placed in position on the shell.

In testimony whereof I have hereunto signed my name to this specification.

GEORGE J. SEISS.